(12) United States Patent
Faruque et al.

(10) Patent No.: US 10,486,604 B2
(45) Date of Patent: Nov. 26, 2019

(54) LUGGAGE-RETENTION DEVICE

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 91 days.

(21) Appl. No.: 15/672,412

(22) Filed: Aug. 9, 2017

(65) Prior Publication Data

US 2019/0047479 A1    Feb. 14, 2019

(51) Int. Cl.
| | |
|---|---|
| *B60R 5/00* | (2006.01) |
| *B60P 7/04* | (2006.01) |
| *B60P 7/08* | (2006.01) |
| *B60R 7/02* | (2006.01) |
| *B60R 5/04* | (2006.01) |
| *B60R 7/08* | (2006.01) |
| *B60R 21/02* | (2006.01) |
| *B60R 21/06* | (2006.01) |
| *B60R 7/04* | (2006.01) |

(52) U.S. Cl.
CPC ................. *B60R 7/02* (2013.01); *B60P 7/04* (2013.01); *B60P 7/0876* (2013.01); *B60R 5/045* (2013.01); *B60R 7/08* (2013.01); *B60R 21/026* (2013.01); *B60R 21/06* (2013.01); *B60R 7/04* (2013.01)

(58) Field of Classification Search
CPC ........... B60R 7/005; B60R 5/00; B60R 5/006; B60R 5/04; B60R 5/044; B60R 5/045; B60P 7/0876; B60P 7/04
USPC ........................................................ 410/118
See application file for complete search history.

(56) References Cited

U.S. PATENT DOCUMENTS

| | | | | |
|---|---|---|---|---|
| 6,099,222 | A  * | 8/2000 | Moore | B60R 7/005 |
| | | | | 296/37.16 |
| 6,921,119 | B2 * | 7/2005 | Haspel | B60R 5/04 |
| | | | | 296/24.4 |
| 6,930,592 | B2 | 8/2005 | Schlecht et al. | |
| 7,048,319 | B2 * | 5/2006 | Ament | B60R 5/047 |
| | | | | 296/37.16 |
| 8,100,615 | B1 * | 1/2012 | Freeborn | B60P 7/14 |
| | | | | 410/130 |
| 8,360,494 | B2 * | 1/2013 | Quiros Perez | B60R 5/048 |
| | | | | 296/24.4 |
| 8,974,157 | B2 * | 3/2015 | Jones | B60R 5/04 |
| | | | | 410/34 |
| 9,283,896 | B2 * | 3/2016 | Murru | B60R 5/04 |
| 9,950,672 | B1 * | 4/2018 | Salazar Fabian | B60J 5/101 |

(Continued)

FOREIGN PATENT DOCUMENTS

| | | |
|---|---|---|
| DE | 19722501 A1 | 12/1997 |
| DE | 102004057112 A1 | 6/2006 |

(Continued)

*Primary Examiner* — Justin M Larson
(74) *Attorney, Agent, or Firm* — Frank A. MacKenzie; Bejin Bieneman PLC

(57) ABSTRACT

A vehicle compartment includes a first track and a second track spaced from each other, a first beam elongated transverse to and slidable along the first track, a second beam elongated transverse to and slidable along the second track, and a net extending from the first beam to the second beam.

20 Claims, 7 Drawing Sheets

(56) References Cited

U.S. PATENT DOCUMENTS

| | | | |
|---|---|---|---|
| 10,239,565 B2 * | 3/2019 | Baker | B62D 33/0273 |
| 2002/0096900 A1 * | 7/2002 | Moore | B60R 7/005 |
| | | | 296/24.43 |
| 2003/0184107 A1 * | 10/2003 | Hapspel | B60R 5/04 |
| | | | 296/24.4 |
| 2012/0261935 A1 * | 10/2012 | Perez | B60R 5/04 |
| | | | 296/24.4 |
| 2017/0259727 A1 * | 9/2017 | Riedel | B60P 7/0876 |
| 2018/0111577 A1 * | 4/2018 | Paftali | B60R 5/04 |
| 2018/0354425 A1 * | 12/2018 | Smith | B60R 7/005 |

FOREIGN PATENT DOCUMENTS

| | | | |
|---|---|---|---|
| DE | 202006014365 U1 | 2/2007 | |
| DE | 102012101367 B3 * | 4/2013 | B60P 7/0876 |
| WO | WO 2016028210 A1 | 2/2016 | |

* cited by examiner

US 10,486,604 B2

LUGGAGE-RETENTION DEVICE

BACKGROUND

Autonomous vehicles have the ability to operate without the intervention of a human operator, e.g., driver; that is, a vehicle controller makes decisions about accelerating, braking, and/or steering the vehicle. A vehicle may be fully autonomous or semiautonomous. A semiautonomous vehicle is autonomous only in particular situations, for example, highway driving or parallel parking, or with respect to certain vehicle subsystems, for example, braking but not acceleration or steering. A fully autonomous vehicle has a vehicle controller that simultaneously controls each of accelerating, braking, and steering.

Vehicles include passenger compartments to house occupants, if any, of the vehicles. The passenger compartment includes front seats disposed at a front of the passenger compartment and rear seats disposed behind the front seats. The front seats are either two buckets seats or a bench seat holding up to two or three occupants. The rear seats are also either two buckets seats or a bench seat holding up to two or three occupants. The passenger compartments of some vehicles also include third-row seats at a rear of the passenger compartment. The front seats, rear seats, and third-row seats all face in a vehicle-forward direction.

DETAILED DESCRIPTION

Figure 1:
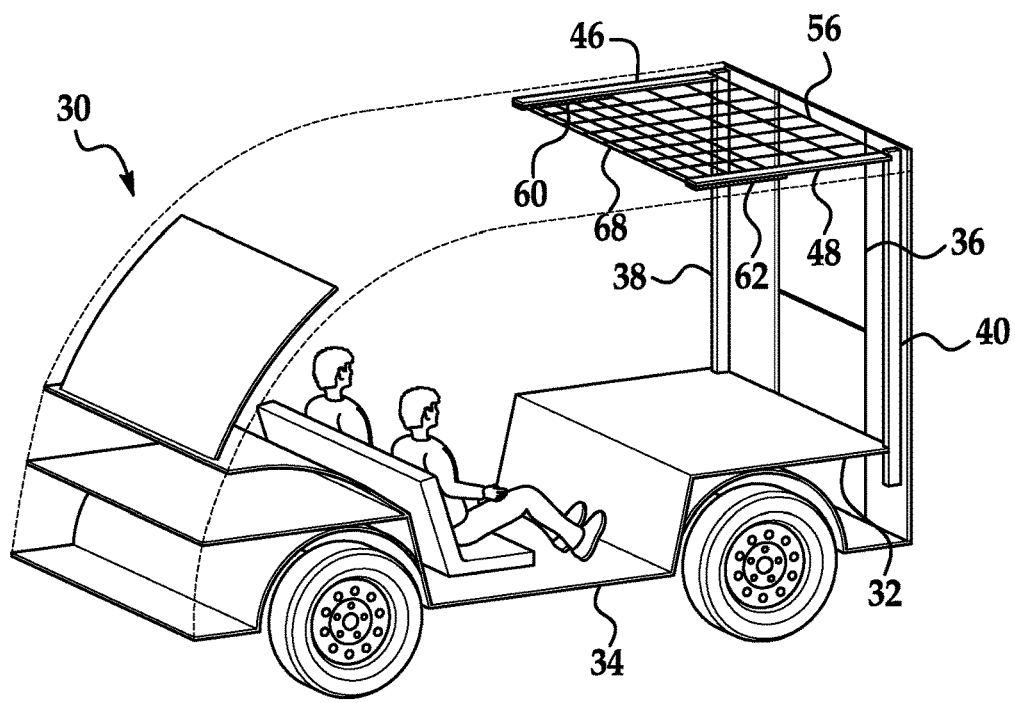
FIG. 1 is a perspective view of a vehicle with a portion of a body removed for illustration and a luggage-retention device in a first position.

A vehicle compartment includes a first track and a second track spaced from each other, a first beam elongated transverse to and slidable along the first track, a second beam elongated transverse to and slidable along the second track, and a net extending from the first beam to the second beam.

The first beam may be cantilevered from the first track, and the second beam may be cantilevered from the second track.

The first beam and the second beam may be parallel.

The first and second beams may each extend from a slidable end slidable along the corresponding track to a free end spaced from the corresponding track; the vehicle compartment may further include a third beam rotatably coupled to the free end of the first beam, and a fourth beam rotatably coupled to the free end of the second beam. The net may be a first net, the vehicle compartment may further include a second net extending from the third beam to the fourth beam.

The third and fourth beams may be rotatable between a retracted position and an extended position. The third beam in the retracted position may extend from the free end of the first beam parallel to the first beam toward the first track, and the fourth beam in the retracted position may extend from the free end of the second beam parallel to the second beam toward the second track.

The third beam in the extended position may extend from the free end of the first beam transverse to the first beam away from the first track, and the fourth beam in the extended position may extend from the free end of the second beam transverse to the second beam away from the second track.

The vehicle compartment may include a first rotary actuator coupling the first beam and the third beam, and a second rotary actuator coupling the second beam and the fourth beam. The vehicle compartment may include a controller in communication with the rotary actuators and programmed to instruct the rotary actuators to move the third and fourth beams from a retracted position to an extended position in response to the first and second beams descending relative to the first and second tracks.

The vehicle compartment may include a controller in communication with the rotary actuators and programmed to instruct the rotary actuators to move the third and fourth beams from an extended position to a retracted position in response to the first and second beams ascending above a height threshold relative to the first and second tracks.

The vehicle compartment may include a motor fixed to one of the first track and the first beam and movably coupled to the other of the first track and the first beam. The vehicle compartment may include a worm gear rotatably coupled to the motor, extending parallel to the first track, and engaged with the first beam.

The vehicle compartment may include a first pulley wheel rotatably coupled to the motor, and a first belt extending around the first pulley wheel, and the first beam may be fixed to the first belt. The vehicle compartment may include a second pulley wheel coupled to the motor, and a second belt extending around the second pulley wheel, and the second beam may be fixed to the second belt.

The motor may be a first motor, and the vehicle compartment may further include a second motor fixed relative to the second track, a second pulley wheel coupled to the second motor, and a second belt extending around the second pulley wheel, and the second beam may be fixed to the second belt.

The vehicle compartment may include a pressure switch coupled to the motor, and the pressure switch may be positioned to deactivate the motor in response to the pressure exceeding a pressure threshold.

The vehicle compartment may include an input switch having first, second, and third positions and in communication with the motor, and the input switch may be configured to instruct the motor to raise the first beam when the input switch is in the first position, to remain stationary when the input switch is in the second position, and to lower the first beam when the input switch is in the third position.

The motor may be a first motor, and the vehicle compartment may further include a second motor fixed relative to the second track and movably coupled to the second beam.

The vehicle compartment may include a door positioned between the tracks.

The vehicle compartment may provide occupants of a vehicle with access to their luggage, such as during travel if the vehicle is autonomous, by having the vehicle compartment accessible within a passenger cabin of the vehicle. The beams and nets may prevent the luggage from moving about and possibly injuring the occupants in the event of, e.g., an impact to the vehicle. The beams and nets may provide convenience by automatically taking a position based on signals from the occupants and/or from sensors.

Figure 2:
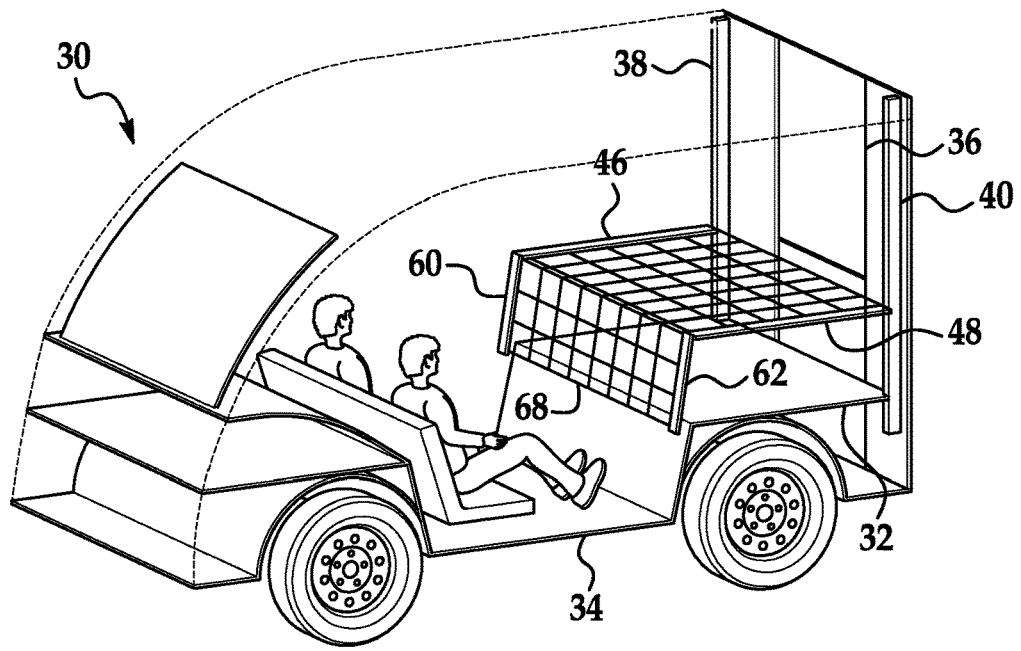
FIG. 2 is a perspective view of the vehicle with the portion of the body removed for illustration and the luggage-retention device in a second position.

With reference to FIGS. 1 and 2, a vehicle 30 may be an autonomous vehicle. A computer (not shown) can be configured to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

The vehicle 30 includes a vehicle compartment 32. The vehicle compartment 32 provides a space to place objects, e.g., luggage. The vehicle compartment 32 may be divided or partially divided from a passenger cabin 34, or the vehicle compartment 32 may be open with the passenger cabin 34, as shown in FIGS. 1 and 2.

With continued reference to FIGS. 1 and 2, a door 36 may be positioned to provide access to the vehicle compartment 32 from outside the vehicle 30. The door 36 may be a front-hinged door, a top-hinged door, a sliding door, or any other suitable type of door. The door 36 may be positioned between tracks 38, 40; i.e., the tracks 38, 40 are elongated along an interior wall of the vehicle 30 on two sides of the door 36.

Figure 3:
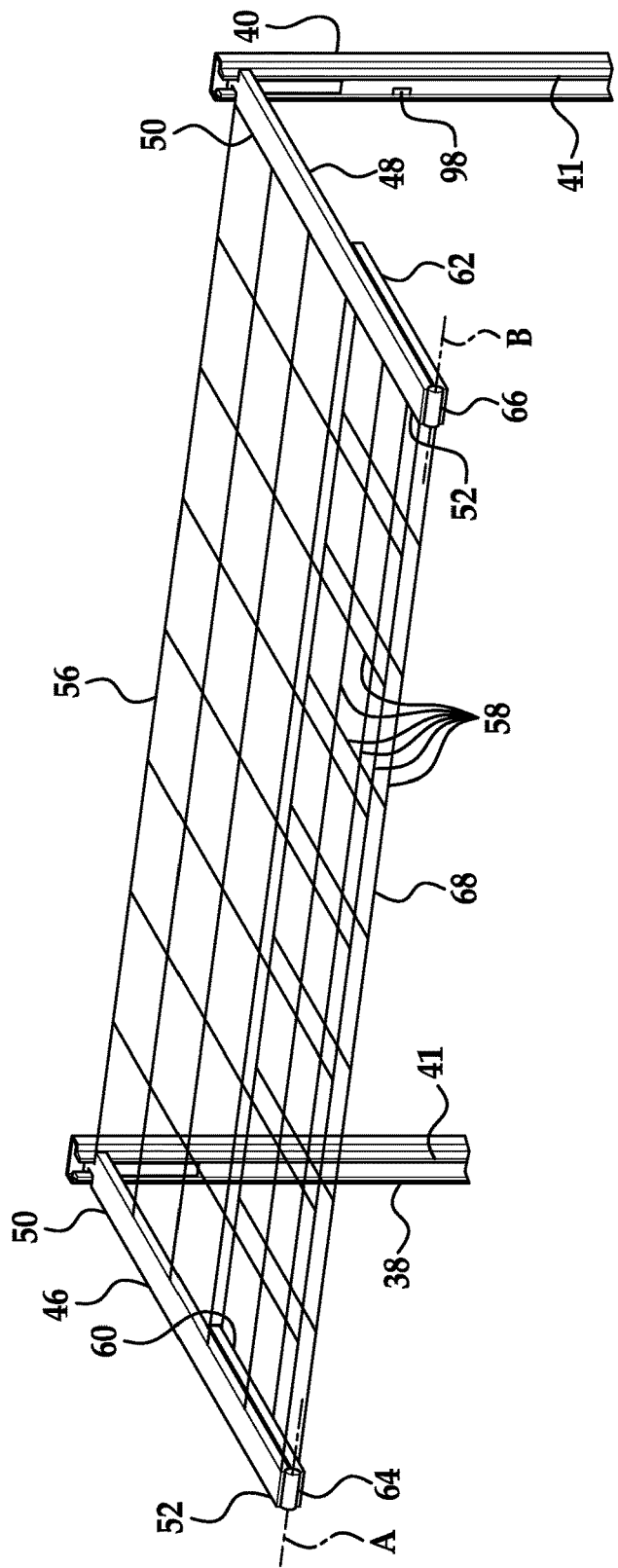
FIG. 3 is a perspective view of a portion of the luggage-retention device in the first position.

With reference to FIGS. 1-3, the tracks 38, 40 include a first track 38 and a second track 40 spaced from each other. The first track 38 may be elongated on the interior wall left of the door 36, and the second track 40 may be elongated on the interior wall right of the door 36. The tracks 38, 40 may extend substantially vertically or may extend farther in a vertical direction than in any direction perpendicular to vertical. The tracks 38, 40 may be substantially parallel. The first track 38 and the second track 40 may be symmetrical with respect to each other; that is, one of the first track 38 and the second track 40 is a mirror image of the other of the first track 38 and the second track 40.

Figure 4:
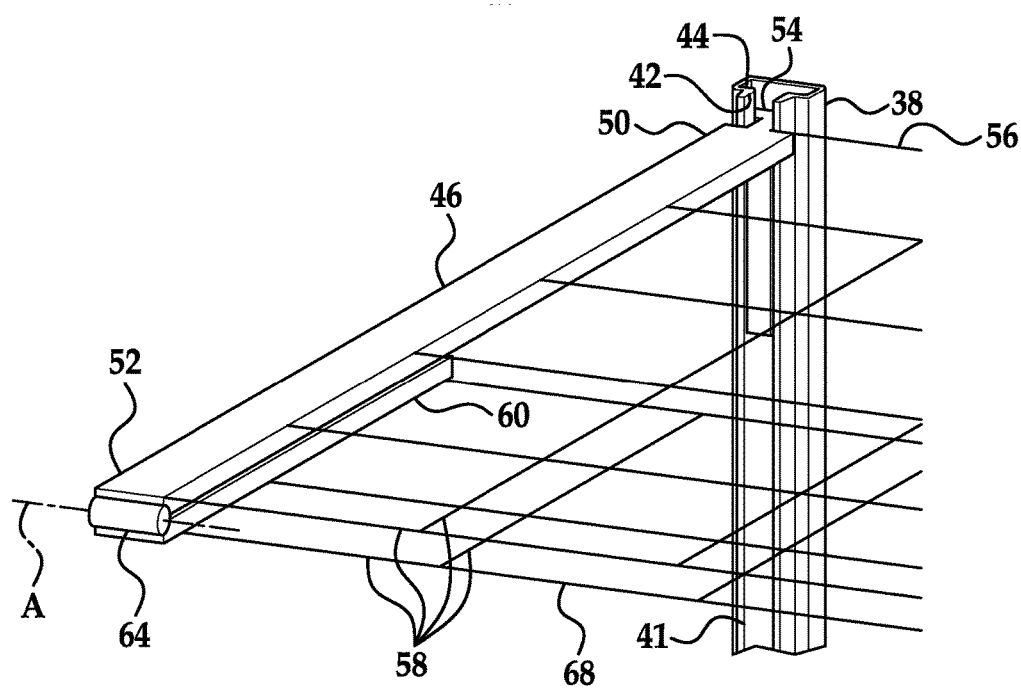
FIG. 4 is a perspective view of a smaller portion of the luggage-retention device in the first position.
Figure 5:
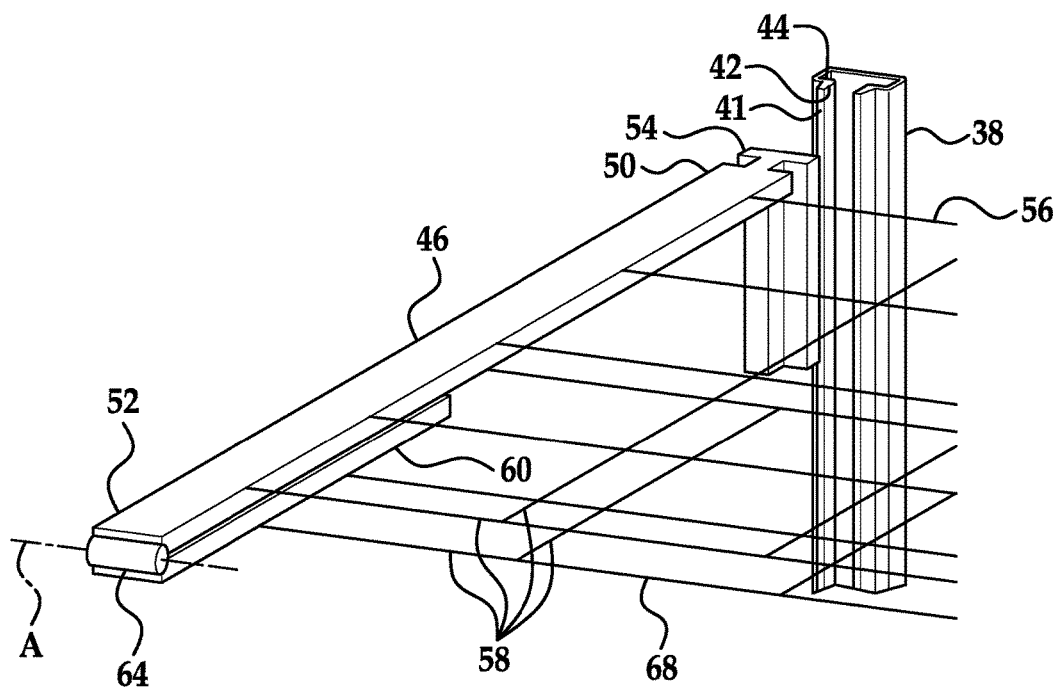
FIG. 5 is an exploded perspective view of the smaller portion of the luggage-retention device in the first position.
Figure 6:
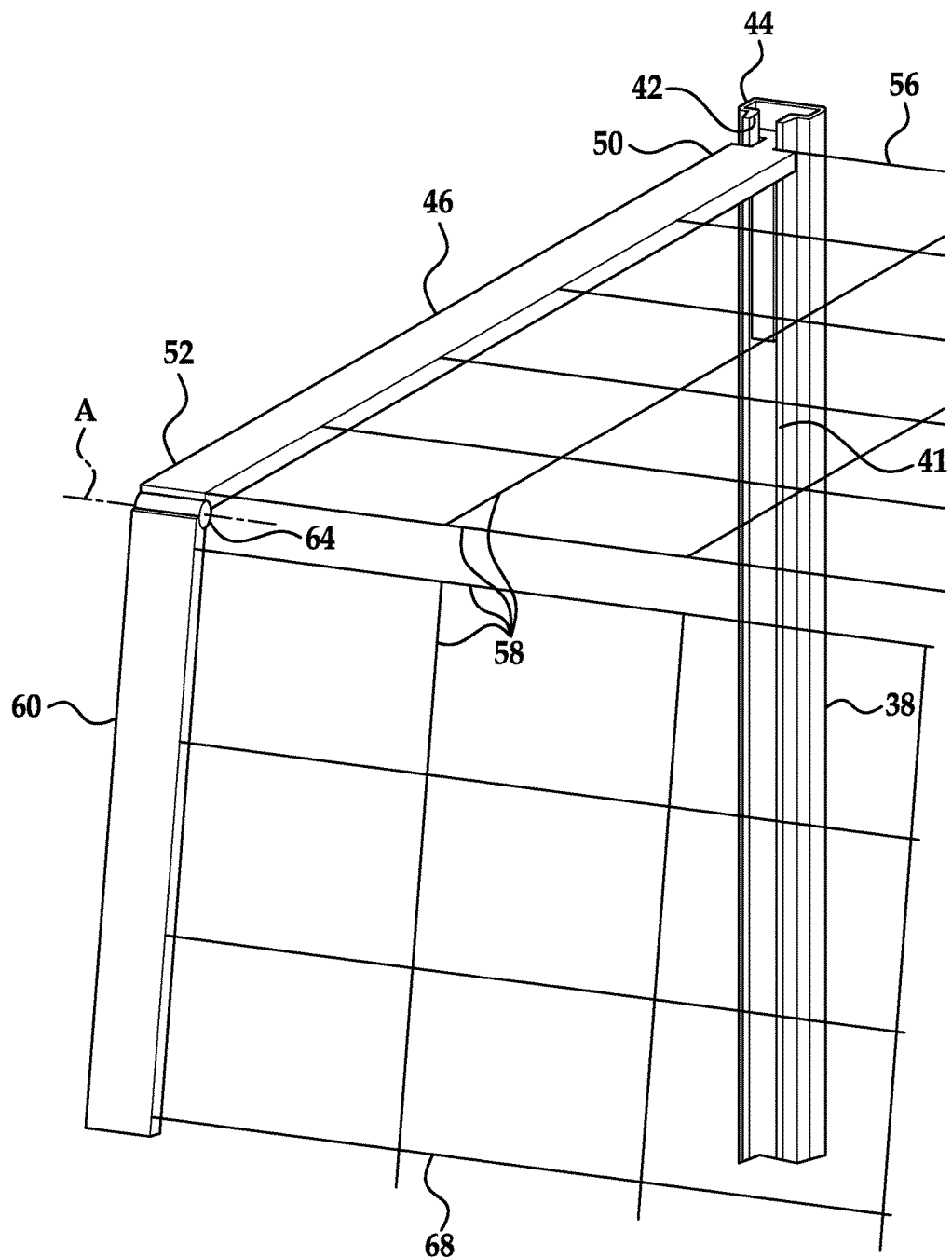
FIG. 6 is a perspective view of the smaller portion of the luggage-retention device in the second position.

With reference to FIGS. 4-6, the first track 38 and the second track 40 each include a slot 41 elongated along the track. The slots 41 may have a constant cross-sectional shape along the length of the first or second track 40. The cross-sectional shape of the slots 41 may include an opening 42 extending from a surface of the first or second track 40 and a passageway 44 connected to the opening 42. Each passageway 44 is not connected to the surface of the first or second track 38, 40 other than via the corresponding opening 42 or possibly ends of the first or second track 38, 40. The passageways 44 may be wider than the openings 42. For example, the cross-sectional shape of the slots 41 may be T-shaped, as shown in FIGS. 4-6. The cross-sectional shape of the slots 41 may be any shape suitable for an object to slide in the slots 41 without exiting the slots 41.

With reference to FIGS. 1-6, a first beam 46 is elongated transverse to the first track 38, and a second beam 48 is elongated transverse to the second track 40. The first beam 46 and the second beam 48 may be parallel. The first and second beams 46, 48 may each extend from a slidable end 50 to a free end 52. The slidable end 50 is slidable along the corresponding track. The free end 52 is spaced from the corresponding track. The first beam 46 may be cantilevered from the first track 38, meaning the first beam 46 is elongated from an end attached to the first track 38 to an unsupported end. The end attached to the first track 38 is the slidable end 50, and the unsupported end is the free end 52. The second beam 48 may be cantilevered from the second track 40.

With reference to FIGS. 4-6, the first beam 46 is slidable along the first track 38, and the second beam 48 is slidable along the second track 40. Specifically, the slidable ends 50 of the first beam 46 and the second beam 48 are slidable along the corresponding tracks 38, 40. Each slidable end 50 is disposed in one of the slots 41. The slidable ends 50 may be elongated transverse to the corresponding first or second beam 46, 48 along the corresponding passageways 44. The slidable ends 50 each have a sliding portion 54 that is wider than the opening 42 disposed in the corresponding passageway 44. As the first or second beam 46, 48 slides along the first or second track 38, 40, the sliding portions 54 of the slidable ends 50 slide in the passageways 44 of the corresponding slots 41.

With reference to FIGS. 1-6, a first net 56 extends from the first beam 46 to the second beam 48. The first net 56 may have a gridlike pattern. The gridlike pattern may extend from the first beam 46 to the second beam 48, or alternatively, the first net 56 may include a gap between the first net 56 and the first beam 46 and/or the second beam 48. As one example, the first net 56 may include a plurality of cords 58 arranged in a gridlike pattern. The cords 58 may be spaced closely enough to hold down objects typically stored in the vehicle compartment 32; for example, the cords 58 may be two or three times closer together than a dimension of a smallest of typical objects stored in the storage space, e.g., a bag of groceries. The cords 58 may be of any suitably flexible material with a suitably high tensile strength, e.g., nylon. In another example, the first net 56 may be a mesh, a fabric panel, etc.

A third beam 60 is rotatably coupled to the free end 52 of the first beam 46, and a fourth beam 62 is rotatably coupled to the free end 52 of the second beam 48. The third and fourth beams 60, 62 are each elongated from the free ends 52 of the first and second beams 46, 48. The third beam 60 is rotatable relative to the first beam 46 about a first axis A extending perpendicular to first beam 46 at the free end 52, and the fourth beam 62 is rotatable relative to the second beam 48 about a second axis B extending perpendicular to the second beam 48 and the free end 52.

With continued reference to FIGS. 1-6, the third and fourth beams 60, 62 are rotatable between a retracted position, shown in FIGS. 1 and 3-5, and an extended position, shown in FIGS. 2 and 6. The third beam 60 rotates between the retracted position and the extended position about the first axis A, and the fourth beam 62 rotates between the retracted position and the extended position about the second axis B. The third beam 60 in the retracted position extends from the free end 52 of the first beam 46 parallel to the first beam 46 toward the first track 38, and the fourth beam 62 in the retracted position extends from the free end 52 of the second beam 48 parallel to the second beam 48 toward the second track 40; in other words, the third and fourth beams 60, 62 in the retracted position are disposed against the first or second track 38, 40. The third beam 60 in the extended position extends from the free end 52 of the first beam 46 transverse to the first beam 46 away from the first track 38, and the fourth beam 62 in the extended position extends from the free end 52 of the second beam 48 transverse to the second beam 48 away from the second track 40; in other words, the third and fourth beams 60, 62 in the extended position form an obtuse angle with the first or second beam 46, 48.

With reference to FIGS. 3-6, a first rotary actuator 64 couples the first beam 46 and the third beam 60, and a second rotary actuator 66 couples the second beam 48 and the fourth beam 62. The first rotary actuator 64 can actuate to rotate the third beam 60 about the first axis A between the retracted position and the extended position. The second rotary actuator 66 can actuate to rotate the fourth beam 62 about the second axis B between the retracted position and the extended position. The rotary actuators 64, 66 can be any device able to provide a rotary output to a designated angle, e.g., an electric motor such as a servomotor.

A second net 68 extends from the third beam 60 to the fourth beam 62. The second net 68 is formed of a plurality of the cords 58 arranged in a gridlike pattern. The cords 58 may be spaced closely enough to hold down objects typically stored in the vehicle compartment 32; for example, the cords 58 may be two or three times closer together than a dimension of a smallest of typical objects stored in the storage space, e.g., a bag of groceries. The cords 58 may be formed of any suitably flexible material with a suitably high tensile strength, e.g., nylon.

Figure 7:
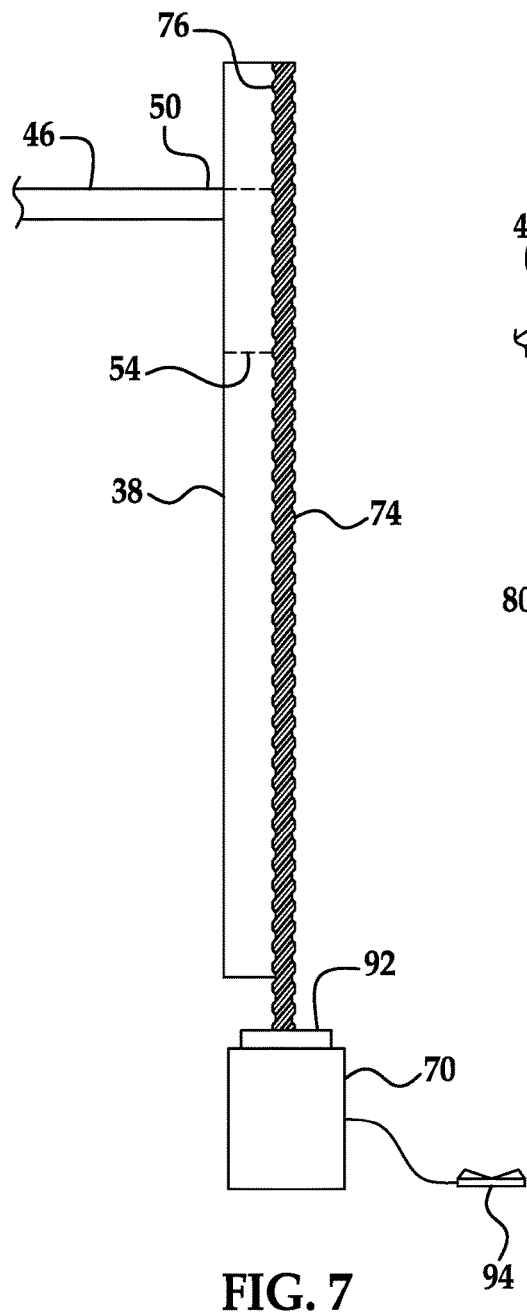
FIG. 7 is a side diagram of an example movement system of the luggage-retention device.
Figure 8:
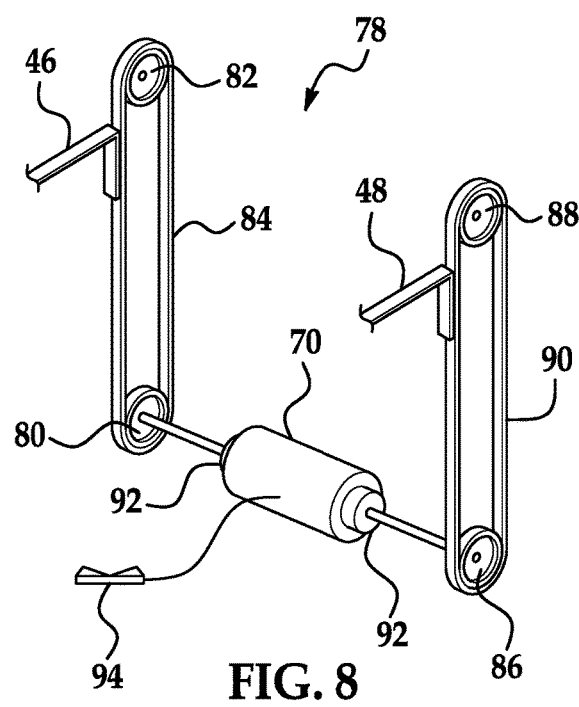
FIG. 8 is a perspective diagram of another example movement system of the luggage-retention device.
Figure 9:
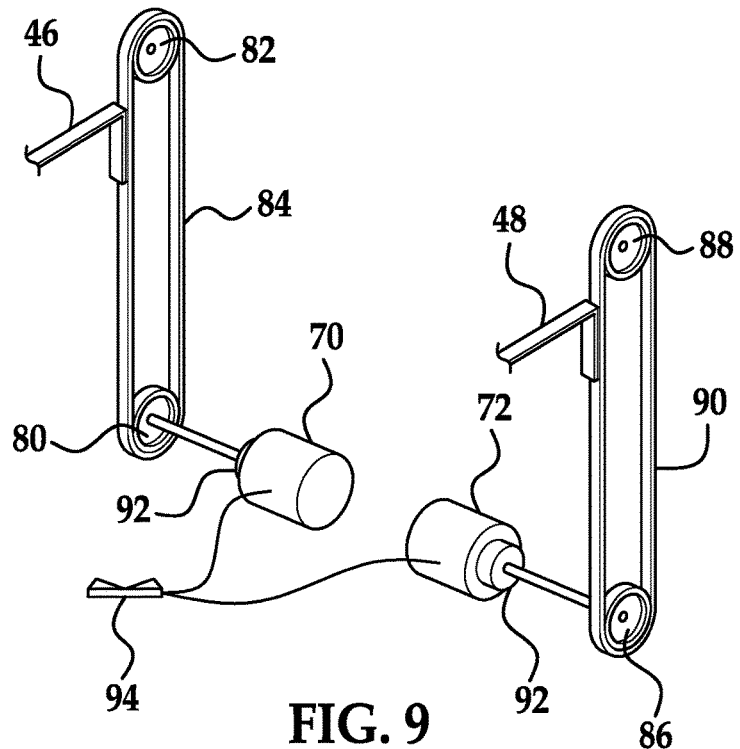
FIG. 9 is a perspective diagram of another example movement system of the luggage-retention device.

With reference to FIGS. 7-9, a first motor 70 is fixed to the first track 38 and movably coupled to the first beam 46. The first motor 70 may be fixed to the second track 40 and movably coupled to the second beam 48, as shown in FIG. 8. Alternatively, a second motor 72 may be fixed to the second track 40 and movably coupled to the second beam 48, as shown in FIG. 9. Further alternatively, the first motor 70 may be fixed to the first beam 46 and movably coupled to the first track 38, and the first motor 70 or the second motor 72 may be fixed to the second beam 48 and movably coupled to the second track 40.

With reference to FIG. 7, the first motor 70 or the motors 70, 72 may be movably coupled to the first and second beams 46, 48 via two worm gears 74. For example, the worm gears 74 may be rotatably coupled to the first motor 70. Alternatively, one of the worm gears 74 may be rotatably coupled to the first motor 70 and the other of the worm gears 74 may be rotatably coupled to the second motor 72. The worm gears 74 may have a cylindrical shape with a spiral groove. One worm gear 74 extends and is elongated parallel to the first track 38 and is engaged with the first beam 46, and the other worm gear 74 extends and is elongated parallel to the second track 40 and is engaged with the second beam 48. The first and second beams 46, 48 each have a mating section 76 having grooves mateable with the spiral grooves of the worm gears 74.

With reference to FIGS. 8 and 9, the first motor 70 or the motors 70, 72 may be movably coupled to the first and second beams 46, 48 via a pulley system 78. The pulley system 78 includes a first lower pulley wheel 80, a first upper pulley wheel 82, a first belt 84 extending around the first lower and first upper pulley wheels 80, 82, a second lower pulley wheel 86, a second upper pulley wheel 88, and a second belt 90 extending around the second lower and second upper pulley wheels 86, 88. The first lower pulley wheel 80 or the first upper pulley wheel 82 is drivably coupled to the first motor 70, and the second lower pulley wheel 86 or the second upper pulley wheel 88 is drivably coupled to the first motor 70 or to the second motor 72. The first beam 46 is fixed to the first belt 84, and the second beam 48 is fixed to the second belt 90. As the first motor 70 or the motors 70, 72 rotate the lower pulley wheels 80, 86 or the upper pulley wheels 82, 88, the belts 84, 90 move the first and second beams 46, 48 up or down, depending on the direction of rotation.

With reference to FIGS. 7-9, a pressure switch 92 is coupled to each of the motors 70, 72. A pressure is generated by operation of the first or second motor 70, 72, and each pressure switch 92 is positioned to deactivate the first or second motor 70, 72 in response to the pressure exceeding a pressure threshold. The pressure threshold may be chosen to be a pressure generated by the first or second motor 70, 72 when an object resists the motion of the first or second beam 46, 48.

With continued reference to FIGS. 7-9, an input switch 94 may be in communication with the first motor 70 or with the motors 70, 72. The input switch 94 may have a first, second, and third position. The input switch 94 is configured to instruct the first motor 70 to raise the first beam 46 when the input switch 94 is in the first position, to remain stationary when the input switch 94 is in the second position, and to lower the first beam 46 when the input switch 94 is in the third position. If the second motor 72 is present, the input switch 94 may be configured to instruct the second motor 72 to raise the second beam 48 when the input switch 94 is in the first position, to remain stationary when the input switch 94 is in the second position, and to lower the second beam 48 when the input switch 94 is in the third position. The input switch 94 may be positioned in a location accessible by an occupant of the vehicle 30.

Figure 10:
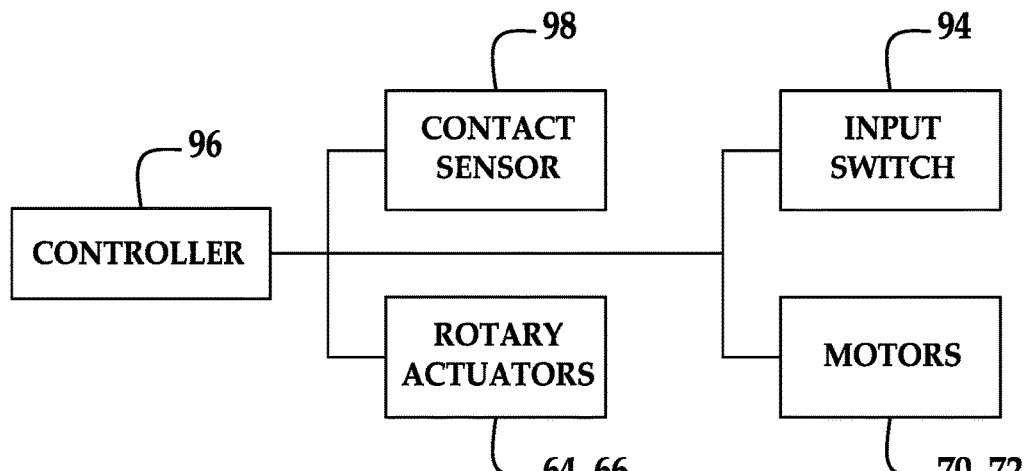
FIG. 10 is a block diagram of a control system of the luggage-retention device.

With reference to FIG. 10, a controller 96 may be in communication with the rotary actuators 64, 66, a contact sensor 98, the input switch 94, and/or the motors 70, 72. The controller 96 is a microprocessor-based controller. The controller 96 includes a processor, memory, etc. The memory of the controller 96 includes memory for storing instructions executable by the processor as well as for electronically storing data and/or databases.

With reference to FIGS. 3 and 10, the contact sensor 98 may be attached to one of the first and second tracks 38, 40. The contact sensor 98 may be positioned in the slot 41 of one of the first and second tracks 38, 40. The contact sensor 98 may be any sensor that detects whether the slidable end 50 of the first or second track 38, 40 is next to or spaced from the contact sensor 98. For example, the contact sensor 98 may be a pressure sensor that detects the slidable end 50 pushing against the contact sensor 98. For another example, the contact sensor 98 may be a proximity sensor that detects whether a laser, infrared beam, etc. is interrupted.

The controller 96 may be programmed to instruct the rotary actuators 64, 66. For example, the controller 96 may be programmed to instruct the first motor 70 or the motors 70, 72 to raise the first and second beams 46, 48 in response to a signal indicating that the door 36 has just been opened, and the controller 96 may be programmed to instruct the first motor 70 or the motors 70, 72 to lower the first and second beams 46, 48 in response to a signal indicating that the door 36 has just been closed. The door 36 may be equipped with a sensor (not shown) indicating whether the door 36 is open or closed that is in communication with the controller 96.

Figure 11:
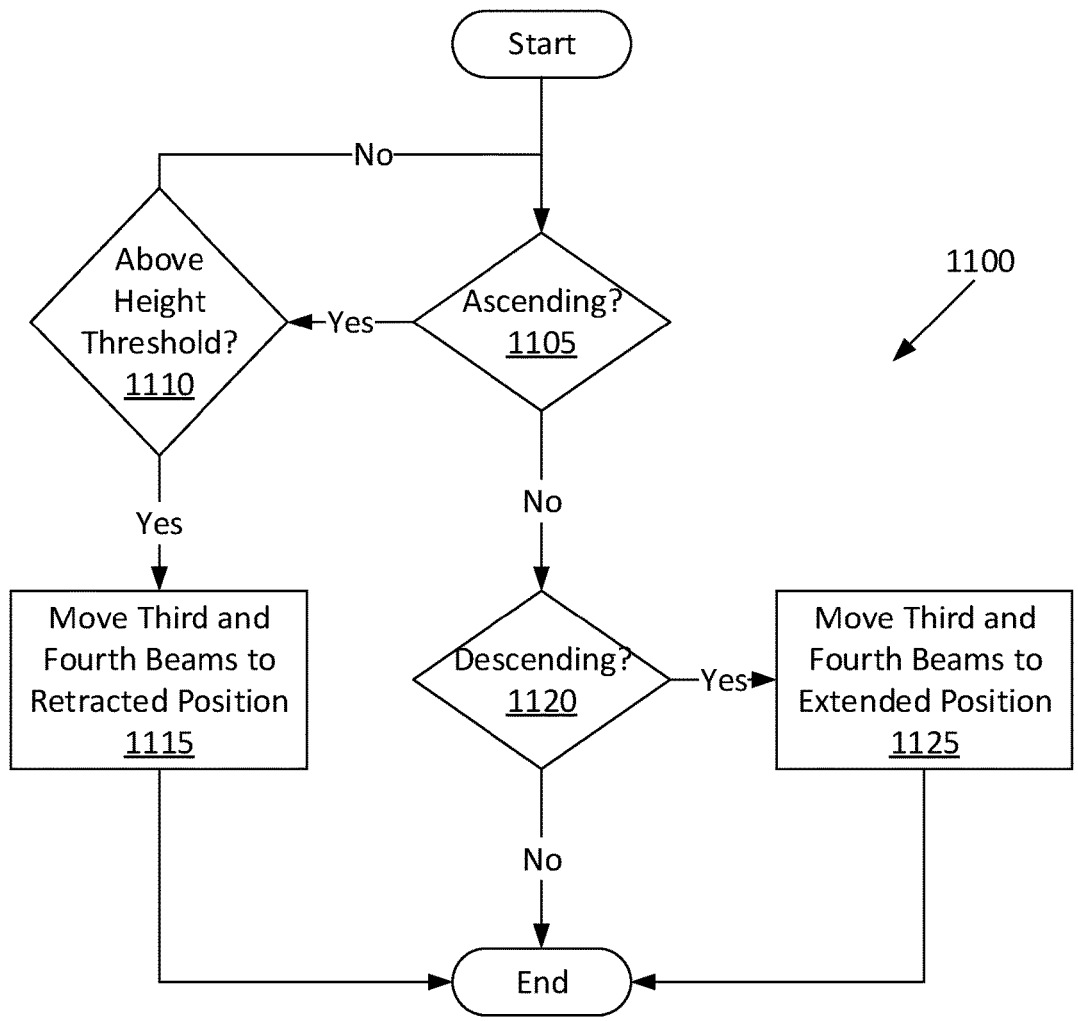
FIG. 11 is a process flow diagram of a process for controlling rotary actuators of the luggage-retention device.

With reference to FIG. 11, for another example, the controller 96 may be programmed to receive a signal that the first and second beams 46, 48 have ascended past a height threshold. The height threshold is a vertical position along one of the tracks 38, 40. The height threshold may be chosen to be sufficiently high that the third and fourth beams 60, 62 are unlikely to strike cargo in the vehicle compartment 32 when moving. The contact sensor 98 may be positioned at the height threshold, and the signal may come from the contact sensor 98. The controller 96 may be programmed to instruct the rotary actuators 64, 66 to move the third and fourth beams 60, 62 from the extended position to the retracted position in response to the first and second beams 46, 48 ascending above the height threshold relative to the first and second tracks 38, 40, such as in response to the signal, as shown in blocks 1105, 1110, and 1115 of a process 1100 for the controller 96.

With continued reference to FIG. 11, for another example, the controller 96 may be programmed to receive a signal instructing that the first and second beams 46, 48 should descend. The signal may come from the contact sensor 98, the first motor 70, the input switch 94, etc. The controller 96 may be programmed to instruct the rotary actuators 64, 66 to move the third and fourth beams 60, 62 from the retracted position to the extended position in response to the first and second beams 46, 48 descending relative to the first and second tracks 38, 40, e.g., in response to the signal instructing that the first and second beams 46, 48 should descend or in response to a signal indicating that the first and second beams 46, 48 are descending, as shown in blocks 1120 and 1125 of the process 1100 for the controller 96.

In operation, the first and second beams 46, 48 may be raised in response to an occupant opening the door 36 or turning the input switch 94 to the first position until the first and second beams 46, 48 are sufficiently raised. As the first and second beams 46, 48 cross the height threshold, the third and fourth beams 60, 62 are rotated by the rotary actuators 64, 66 to the retracted position. The occupant may then place luggage in the vehicle compartment 32. The occupant may then close the door 36 or turn the input switch 94 to the third position, causing the first and second beams 46, 48 to lower and the third and fourth beams 60, 62 to rotate to the extended position. The first and second beams 46, 48 may cease lowering when the pressure switch 92 is triggered or when the occupant turns the input switch 94 to the second position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle compartment comprising:
a first track and a second track spaced from each other;
a first beam elongated transverse to and slidable along the first track;
a second beam elongated transverse to and slidable along the second track, wherein the first and second beams each extend from a slidable end slidable along the corresponding track to a free end spaced from the corresponding track;
a net extending from the first beam to the second beam;
a third beam rotatably coupled to the free end of the first beam; and
a fourth beam rotatably coupled to the free end of the second beam.

2. The vehicle compartment of claim 1, wherein the first beam is cantilevered from the first track, and the second beam is cantilevered from the second track.

3. The vehicle compartment of claim 1, wherein the first beam and the second beam are parallel.

4. The vehicle compartment of claim 1, wherein the net is a first net, the vehicle compartment further comprising a second net extending from the third beam to the fourth beam.

5. The vehicle compartment of claim 1, further comprising a door positioned between the tracks.

6. The vehicle compartment of claim 1, wherein the third and fourth beams are rotatable between a retracted position and an extended position.

7. The vehicle compartment of claim 6, wherein the third beam in the retracted position extends from the free end of the first beam parallel to the first beam toward the first track, and the fourth beam in the retracted position extends from the free end of the second beam parallel to the second beam toward the second track.

8. The vehicle compartment of claim 6, wherein the third beam in the extended position extends from the free end of the first beam transverse to the first beam away from the first track, and the fourth beam in the extended position extends from the free end of the second beam transverse to the second beam away from the second track.

9. The vehicle compartment of claim 1, further comprising a first rotary actuator coupling the first beam and the third beam, and a second rotary actuator coupling the second beam and the fourth beam.

10. The vehicle compartment of claim 9, further comprising a controller in communication with the rotary actuators and programmed to instruct the rotary actuators to move the third and fourth beams from a retracted position to an extended position in response to the first and second beams descending relative to the first and second tracks.

11. The vehicle compartment of claim 9, further comprising a controller in communication with the rotary actuators and programmed to instruct the rotary actuators to move the third and fourth beams from an extended position to a retracted position in response to the first and second beams ascending above a height threshold relative to the first and second tracks.

12. A vehicle compartment comprising:
a first track and a second track spaced from each other;
a first beam elongated transverse to and slidable along the first track;
a second beam elongated transverse to and slidable along the second track;
a net extending from the first beam to the second beam;
a motor fixed to one of the first track and the first beam and movably coupled to the other of the first track and the first beam; and
a pressure switch coupled to the motor, the pressure switch positioned to deactivate the motor in response to the pressure exceeding a pressure threshold.

13. The vehicle compartment of claim 12, further comprising a worm gear rotatably coupled to the motor, extending parallel to the first track, and engaged with the first beam.

14. The vehicle compartment of claim 12, further comprising a first pulley wheel rotatably coupled to the motor, and a first belt extending around the first pulley wheel, the first beam fixed to the first belt.

15. The vehicle compartment of claim 14, further comprising a second pulley wheel coupled to the motor; and a second belt extending around the second pulley wheel, the second beam fixed to the second belt.

16. The vehicle compartment of claim 14, wherein the motor is a first motor, the vehicle compartment further comprising a second motor fixed relative to the second track, a second pulley wheel coupled to the second motor, and a second belt extending around the second pulley wheel, the second beam fixed to the second belt.

17. The vehicle compartment of claim 12, further comprising an input switch having first, second, and third positions and in communication with the motor, the input switch being configured to instruct the motor to raise the first beam when the input switch is in the first position, to remain stationary when the input switch is in the second position, and to lower the first beam when the input switch is in the third position.

18. The vehicle compartment of claim 12, wherein the motor is a first motor, the vehicle compartment further comprising a second motor fixed relative to the second track and movably coupled to the second beam.

19. A vehicle compartment comprising:
a first track and a second track spaced from each other;
a first beam elongated transverse to and slidable along the first track;
a second beam elongated transverse to and slidable along the second track;
a net extending from the first beam to the second beam;
a motor fixed to one of the first track and the first beam and movably coupled to the other of the first track and the first beam; and
a worm gear rotatably coupled to the motor, extending parallel to the first track, and engaged with the first beam.

20. A vehicle compartment comprising:
a first track and a second track spaced from each other;
a first beam elongated transverse to and slidable along the first track;
a second beam elongated transverse to and slidable along the second track;
a net extending from the first beam to the second beam;
a motor fixed to one of the first track and the first beam and movably coupled to the other of the first track and the first beam; and
an input switch having first, second, and third positions and in communication with the motor, the input switch being configured to instruct the motor to raise the first beam when the input switch is in the first position, to remain stationary when the input switch is in the second position, and to lower the first beam when the input switch is in the third position.

* * * * *